(12) United States Patent
Brey et al.

(10) Patent No.: US 7,451,219 B2
(45) Date of Patent: Nov. 11, 2008

(54) DETERMINING SERVER RESOURCES ACCESSIBLE TO CLIENT NODES USING INFORMATION RECEIVED AT THE SERVER VIA A COMMUNICATIONS MEDIUM

(75) Inventors: Thomas M. Brey, Cary, NC (US); Giles R. Frazier, Austin, TX (US); Gregory F. Pfister, Austin, TX (US); Renato J. Recio, Austin, TX (US); Gregory S. Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 10/702,179

(22) Filed: Nov. 5, 2003

(65) Prior Publication Data

US 2005/0108395 A1    May 19, 2005

(51) Int. Cl.
*G06F 13/00* (2006.01)
(52) U.S. Cl. .................. 709/225; 709/219; 709/226; 709/229
(58) Field of Classification Search ............. 709/217, 709/219, 223, 225, 226, 229, 227
See application file for complete search history.

(56) References Cited

U.S. PATENT DOCUMENTS

| | | | |
|---|---|---|---|
| 4,843,541 A | 6/1989 | Bean et al. ............... 364/200 |
| 4,968,977 A | 11/1990 | Chinnaswamy et al. ... 340/825.8 |
| 5,253,344 A | 10/1993 | Bostick et al. ............... 395/275 |
| 5,499,384 A | 3/1996 | Lentz et al. ................ 395/821 |
| 5,809,230 A * | 9/1998 | Pereira ........................ 726/35 |
| 5,991,797 A | 11/1999 | Futral et al. ................. 709/216 |
| 6,081,879 A | 6/2000 | Arnott ........................ 711/173 |
| 6,199,113 B1 * | 3/2001 | Alegre et al. ................ 709/229 |
| 6,330,656 B1 | 12/2001 | Bealkowski et al. .......... 712/13 |
| 6,813,501 B2 * | 11/2004 | Kinnunen et al. ......... 455/456.2 |
| 7,143,136 B1 * | 11/2006 | Drenan et al. ............... 709/204 |
| 7,325,097 B1 * | 1/2008 | Darcy ........................ 711/117 |
| 2001/0020228 A1 * | 9/2001 | Cantu et al. ..................... 705/1 |
| 2002/0152293 A1 * | 10/2002 | Hahn et al. ................. 709/223 |
| 2003/0088429 A1 * | 5/2003 | Schmeling et al. ............ 705/1 |
| 2004/0083262 A1 * | 4/2004 | Trantow ..................... 709/203 |
| 2004/0103096 A1 * | 5/2004 | Larsen .......................... 707/9 |

* cited by examiner

*Primary Examiner*—Viet Vu
(74) *Attorney, Agent, or Firm*—John E. Campbell; Blanche E. Schiller, Esq.; Heslin Rothenberg Farley & Mesiti P.C.

(57) ABSTRACT

Resources of a server node are logically divided into a plurality of sets of resources. At least one set of resources is assigned to one or more client nodes. The association of the at least one set of resources with the one or more client nodes is via a data structure stored at the server node. The data structure is provided by a trusted agent over a communications medium coupling the server node and the one or more client nodes. It includes information that indicates the resources accessible by the client nodes. To access the information, an identifier, also provided by a trusted agent, is employed.

14 Claims, 6 Drawing Sheets

ACCESS TABLE 200

| IDENTIFIER 204 | LIST OF RESOURCES 206 |
|---|---|
| P_KEY 1 | LOGICAL RESOURCE MASK |
| ⋮ | |
| P_KEY n | LOGICAL RESOURCE MASK |

202

DETERMINING SERVER RESOURCES ACCESSIBLE TO CLIENT NODES USING INFORMATION RECEIVED AT THE SERVER VIA A COMMUNICATIONS MEDIUM

TECHNICAL FIELD

This invention relates, in general, to managing resources within a communications environment, and in particular, to determining access by one or more client nodes to one or more sets of resources of one or more server nodes of the communications environment.

BACKGROUND OF THE INVENTION

In one embodiment, a communications environment includes a plurality of client nodes coupled to one or more server nodes via a communications medium. One example of the communications medium is the InfiniBand™ transport, an example of which is described in "InfiniBandi Architecture Specification Volume 1," Release 1.1, Nov. 6, 2002, available from the InfiniBand Trade Association at 5440 SW Westgate Drive, Suite 217, Portland, Oreg., 97221, or online at www.Infinibandta.org, which is hereby incorporated herein by reference in its entirety. InfiniBand is a trademark of the InfiniBand Trade Association.

The InfiniBand transport enables a set of interconnected client and server nodes, referred to as a subnet, to communicate with one another. It also provides a partitioning scheme that allows a subnet to be logically subdivided into sets of nodes, referred to as partitions. A partition includes one or more client nodes, as well as one or more server nodes. A node, such as a server node, can be included in more than one partition. The members of a partition communicate with one another, but are unaware of any other partition.

When a node, such as a server node, is included in multiple partitions, all of the resources of that node are accessible by all of the partitions that include that node. This has proven to be disadvantageous for many reasons, including security concerns, as well as costs.

Thus, a need exists for a capability that enables access to resources of a node shared by multiple partitions to be restricted to particular partitions. As one example, a need exists for a capability that facilitates the determining of which resources of a server node are accessible by which partitions that include that node. As a further example, a need exists for a capability that facilitates the determining of which resources of a server node are accessible to particular client nodes.

SUMMARY OF THE INVENTION

The shortcomings of the prior art are overcome and additional advantages are provided through the provision of a method of determining resources accessible to client nodes. The method includes, for instance, receiving information at a server node via a communications medium, the communications medium usable in accessing data at the server node; and using the information to determine one or more resources of a plurality of resources of the server node assigned to a client node.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided within a communications environment for restricting access by client nodes of the environment to particular resources of a server node of the environment. Information provided at the server node over a communications medium via a trusted agent is used to determine which resources of the server node are accessible by one or more client nodes.

Figure 1A:
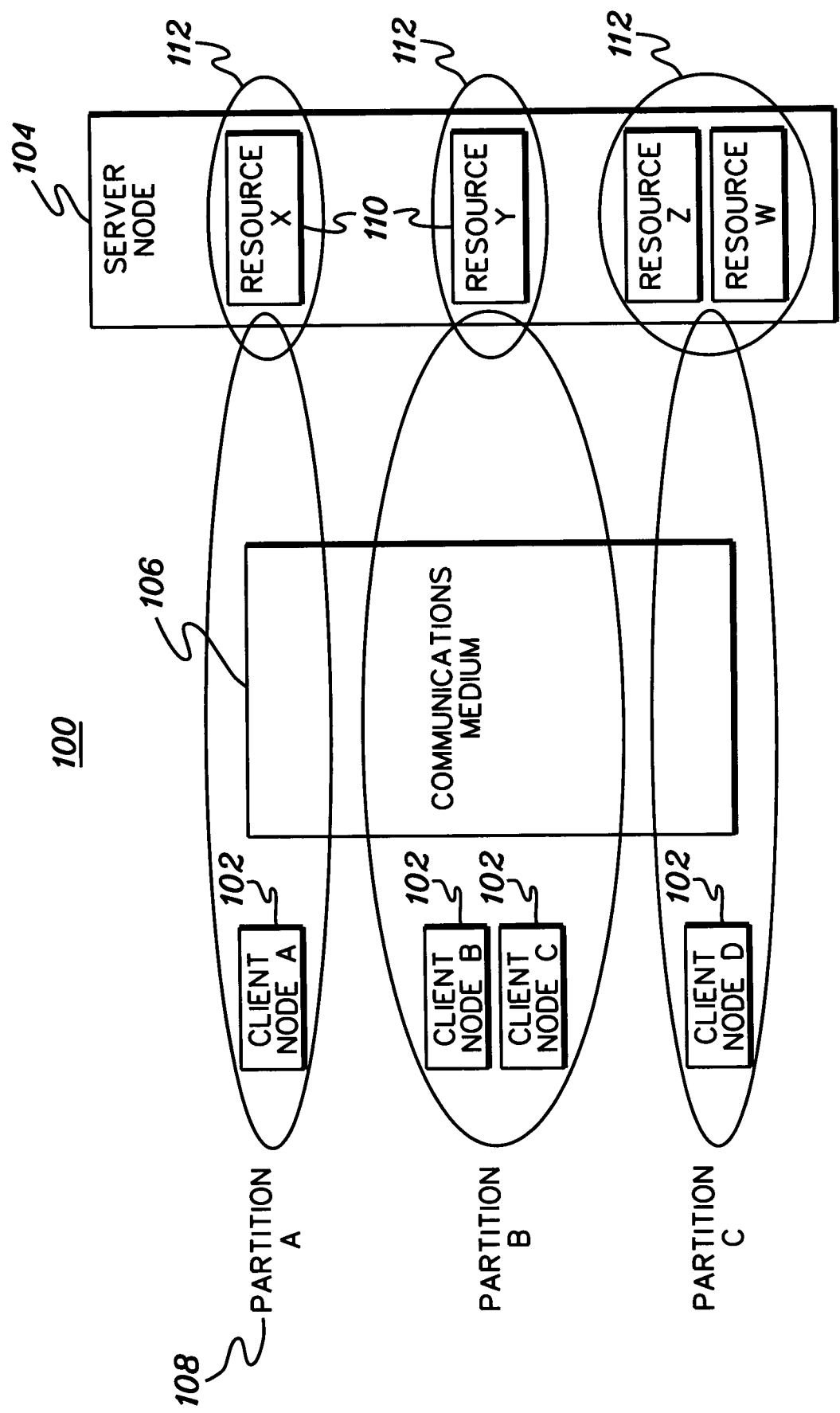
FIG. 1a depicts one embodiment of a communications environment incorporating and using one or more aspects of the present invention.

One embodiment of a communications environment incorporating and using one or more aspects of the present invention is depicted in FIG. 1a. In one example, a communications environment 100 includes a plurality of client nodes 102 coupled to one or more server nodes 104 via a communications medium 106. In one example, a client node 102 is based on the z/Architecture offered by International Business Machines Corporation (IBM®) (IBM® is a registered trademark of International Business Machines Corporation, Armonk, N.Y., U.S.A. Other names used herein may be registered trademarks, trademarks or product names of International Business Machines Corporation or other companies). One embodiment of the z/Architecture is described in "z/Architecture Principles of Operation," Publication No. SA22-7832-01, October 2001, which is hereby incorporated herein by reference in its entirety. As other examples, one or more of the client nodes are based on Unix or other architectures. The nodes may be homogeneous or heterogeneous to one another. As yet a further example, the nodes need not be computing nodes, but may be, for instance, other types of nodes, such as input/output (I/O) nodes.

A set of interconnected client nodes and server node(s) is referred to herein as a subnet. The subnet is logically partitioned, in one example, into a plurality of partitions 108. A partition 108 includes one or more client nodes and one or more server nodes coupled to the client nodes. A node, such as a server node, can be included in multiple partitions. Various partitioning schemes can be used to provide the partitions. In one embodiment, a partitioning scheme offered with the InfiniBand architecture is used to logically subdivide the subnet into partitions. While the members of a partition communicate with one another, a partition is not aware of another partition and members of one partition do not communicate with members of another partition.

Server node 104 includes one or more resources 110 accessible by one or more client nodes. The resources of a server node are divided into one or more sets of resources 112. Many techniques can be used to divide the resources. As one example, an administer divides the resources based on needs of the user, such as the needs of a partition.

Figure 1B:
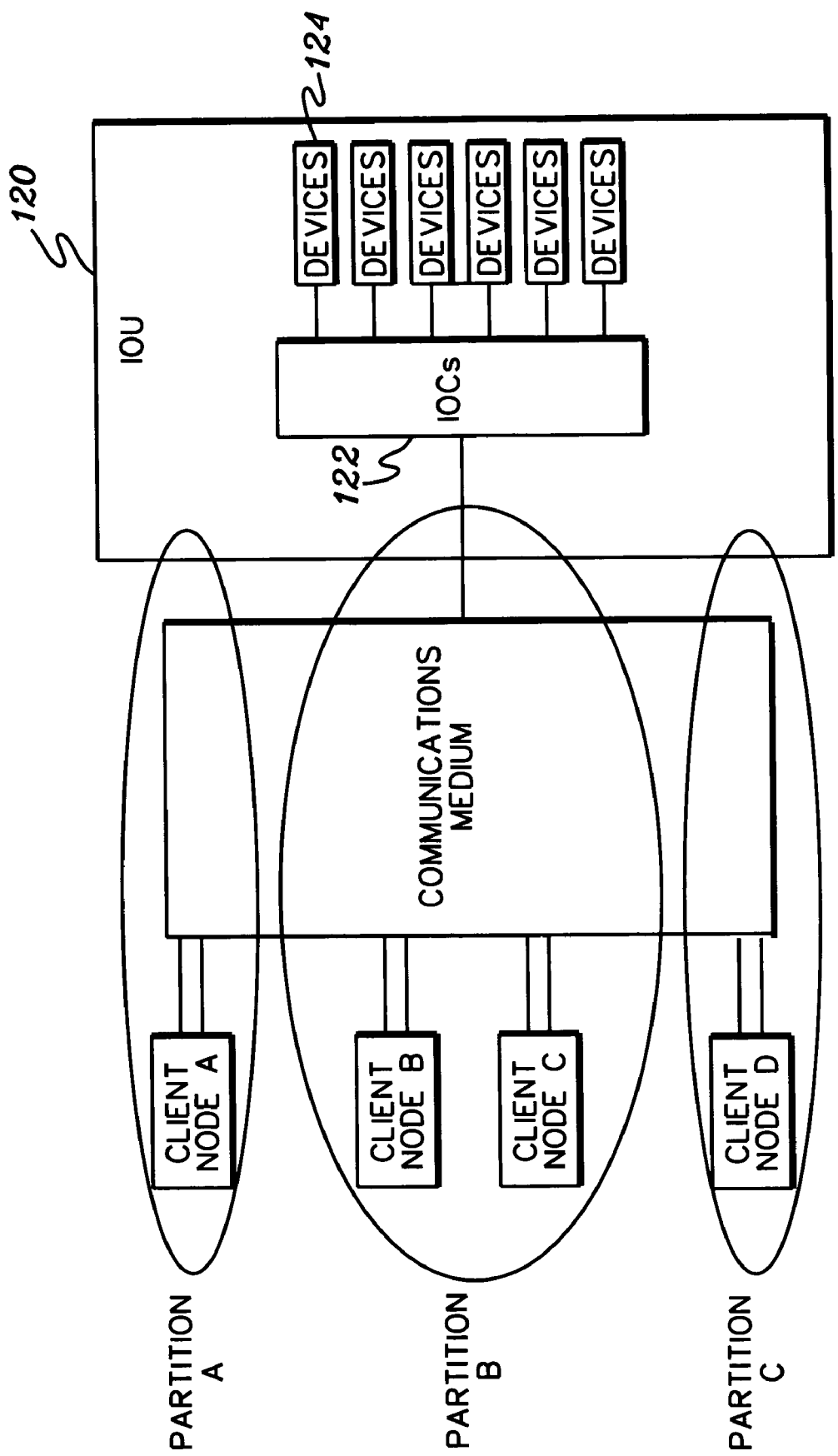
FIG. 1b depicts one embodiment of further details of one example of a server node of FIG. 1a, in accordance with an aspect of the present invention.

In one embodiment, the resources are I/O resources, but other resources may be used. As a particular example, server node 104 is an I/O unit (IOU) 120, as shown in FIG. 1*b*. I/O unit 120 includes, for instance, a plurality of I/O controllers (IOCs) 122 coupled to a plurality of devices 124. The I/O controllers and their associated devices are examples of the resources being divided and associated with the partitions. Although the embodiment described herein is described with reference to an I/O unit, and in particular, to I/O controllers, this is only one example. The resources may include many other types of resources, including, but not limited to, number of connections, type of connection, quality of service, devices, logical units, application instance (target a specific program to communicate to), bandwidth, CPU time handling/managing, etc.

Communications medium 106 includes, for instance, a fabric of switches and routers, such as the InfiniBand fabric. Although the InfiniBand fabric is provided as one example, other fabrics, networks, or other communications media may be used.

In accordance with an aspect of the present invention, a partition is assigned (or associated with) one or more sets of resources of one or more server nodes. Any sets of resources not assigned to a partition are unknown to that partition. This restricts access by the partition to resources assigned to that partition.

The association of a set of resources to a partition is performed in any number of ways. However, in one instance, a data structure is used for the association. This data structure is, for instance, an access table 200 (FIG. 2), which includes one or more entries 202. Each entry includes an identifier 204 identifying the partition for which resources are provided, and a list of resources 206 for that partition. As an example, identifier 204 includes a partition key (P_key) defined for the partition. However, depending on the configuration, it may include additional or other information including, for instance, a global user identifier (GUID), a global identifier (GID) or a local identifier (LID). Other unique identifiers are also usable.

Figure 3:
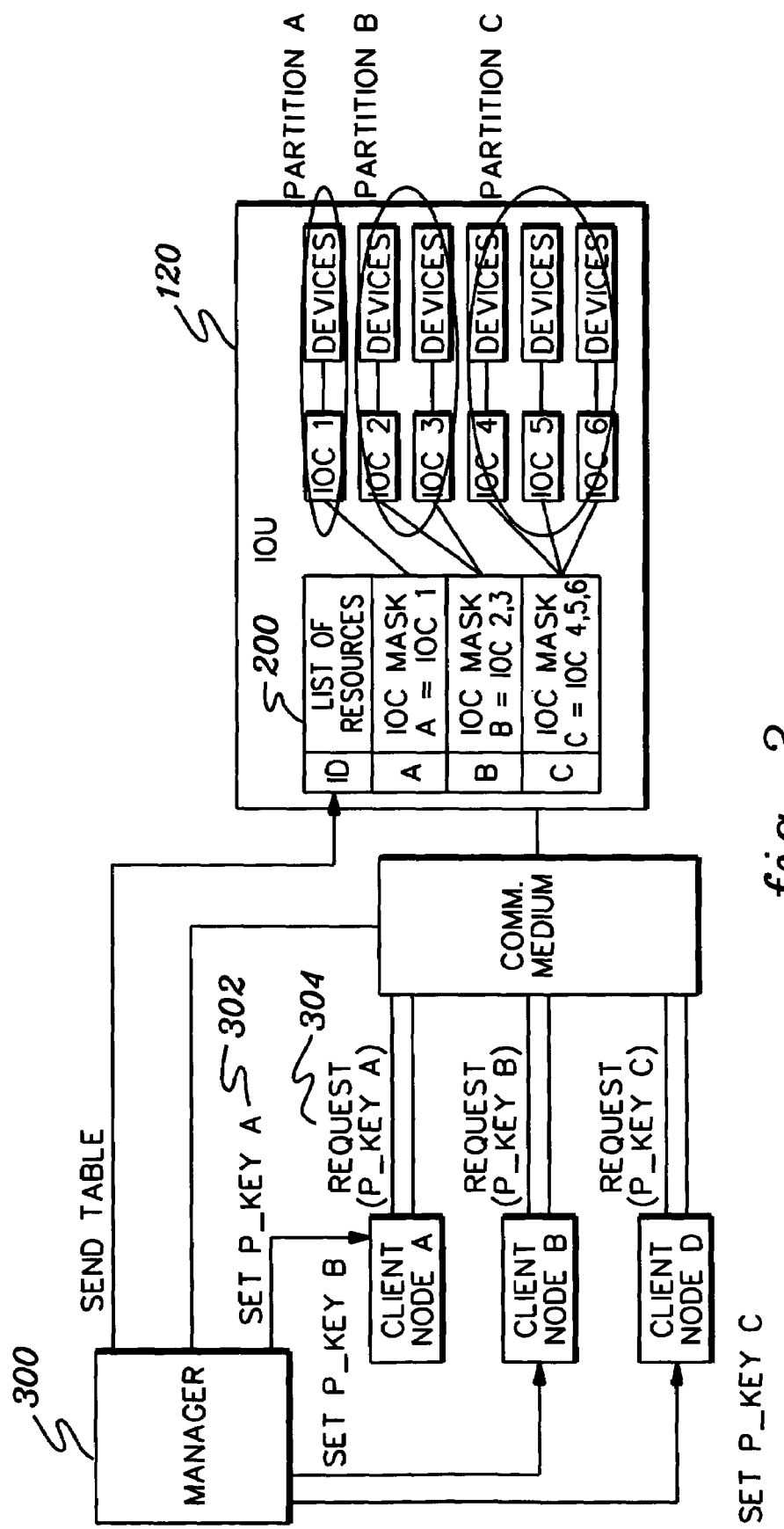
FIG. 3 depicts one embodiment of further details of one example of the data structure of FIG. 2, as well as other information, used to determine the assignment of resources, in accordance with an aspect of the present invention.

List of resources 206 includes, for instance, a logical resource mask having a string of bits, in which each bit represents a potential resource of the server node to be shared. In one example, the bit string includes 256 binary 1's and 0's, one for each possible I/O control unit (IOC) of the IOU to be associated with a partition. A binary 1 in a particular place indicates that the corresponding 10C is assigned to the partition of that row, and a binary 0 indicates that the corresponding 10C is not associated with that partition. In one example as shown in FIG. 3, Partition A (e.g., Client Node A) is associated with IOC 1; Partition B (e.g., Client Nodes B and C) is associated with IOCs 2 and 3; and Partition C (e.g., Client Node D) is associated with IOCs 4, 5 and 6.

Access table 200 is located, for instance, at the server node (e.g., IOU), as depicted in FIG. 3. That is, the access table (or other data structure) is located within the server node or in a storage medium coupled to the server node accessible via the communications medium. The data structure is stored at the server node by, for instance, a manager 300. In one example, this manager is an InfiniBand subnet manager, which is a trusted entity used to perform the resource assignments. The manager assigns the resources to the partitions by sending messages to the server node, which define the resources allocated to each client node in a partition. Access to the server node by the manager includes use of a security key, thus preventing the resources from being reassigned by an untrusted entity.

As examples, the messages used by the manager to assign the resources include an initial access table to be stored at the server node and/or information to update a table already stored at the server node. However, prior to sending the messages, the manager creates the data structure.

Figures 2, 4:
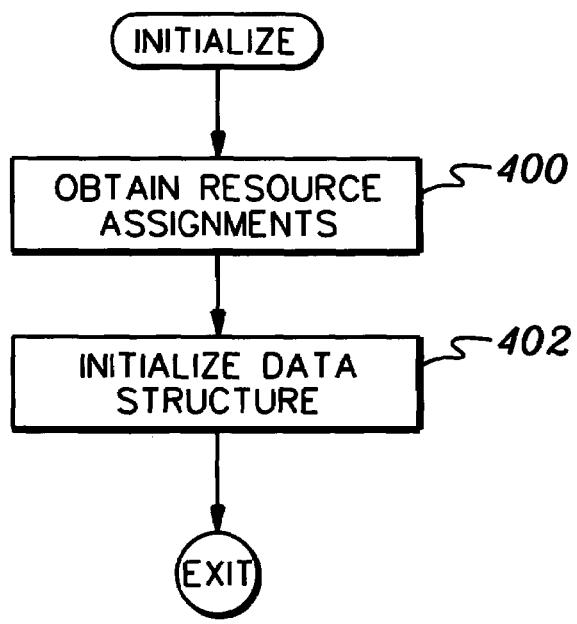
FIG. 2 depicts one embodiment of a data structure used in determining the resources assigned to client nodes, in accordance with an aspect of the present invention.
FIG. 4 depicts one embodiment of the logic associated with initializing the data structure of FIG. 2, in accordance with an aspect of the present invention.

One embodiment of the logic associated with initializing the data structure is described with reference to FIG. 4. In one example, the manager obtains the resource assignments, STEP 400. This includes, for instance, receiving an indication of the resource assignments from a system administrator or other entity, and/or using a technique to decide which resources are to be allocated to which node. Subsequent to obtaining the resource assignments, the data structure (e.g., access table) is initialized to reflect the assignments, STEP 402. For example, for a given partition, the bits of the logical mask corresponding to the assigned resources are set.

Figure 5:
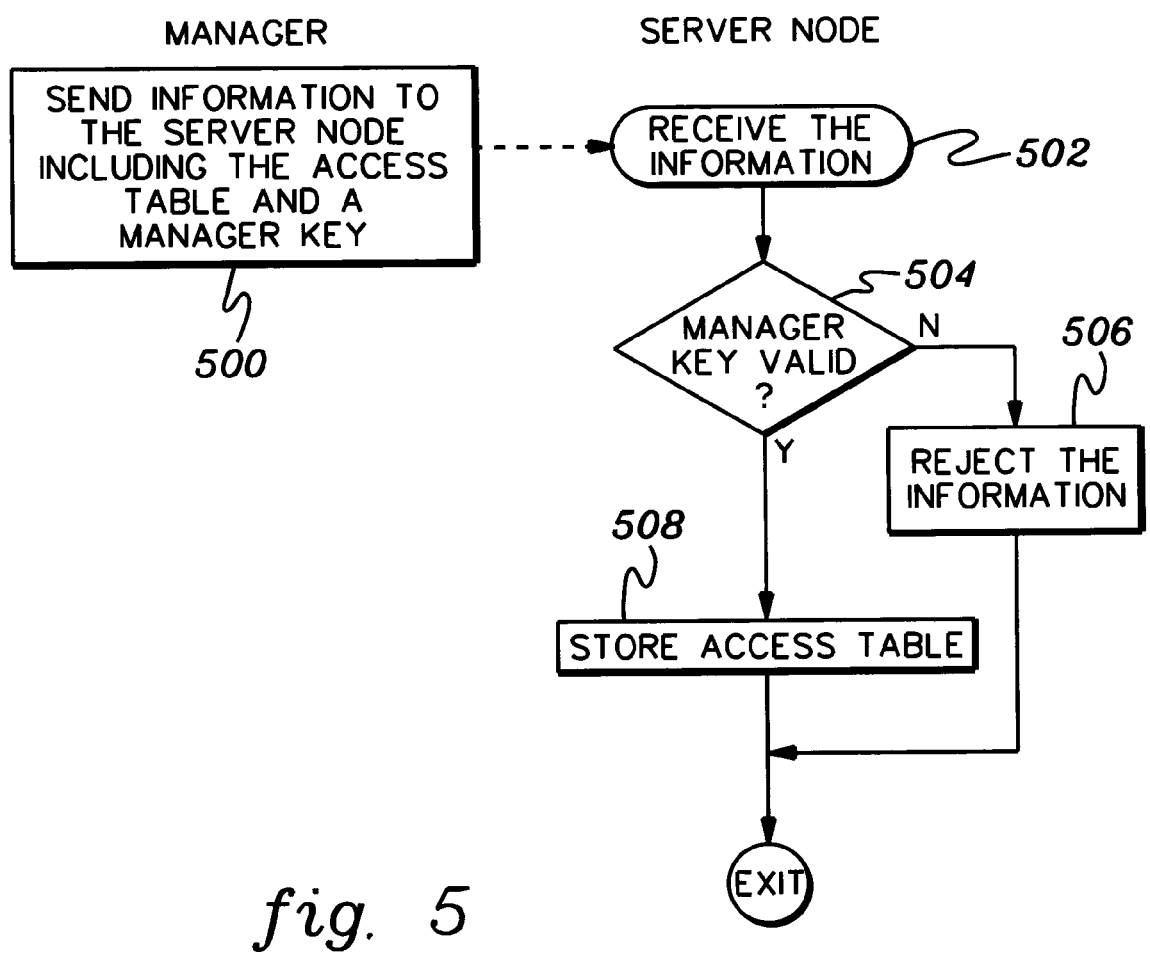
FIG. 5 depicts one embodiment of the logic associated with storing the data structure, in accordance with an aspect of the present invention.

Thereafter, the access table is stored at the server node, as described with reference to FIG. 5. In one example, to load the access table, the manager sends information (e.g., one or more packets) to the server node (e.g., the IOU), which includes the access table and a manager key used for security purposes, STEP 500. The server node receives the information, STEP 502, and determines whether the manager key is valid, INQUIRY 504. If the manager key is not valid, then the information is rejected and the access table is not stored, STEP 506. However, if the manager key is valid, then the access table is stored at the server node, STEP 508. Since the access table is not stored at the server node, unless the information sent by the manager includes a valid manager key, no entity other than a valid manager is able to store the access table at the server node.

Figure 6:
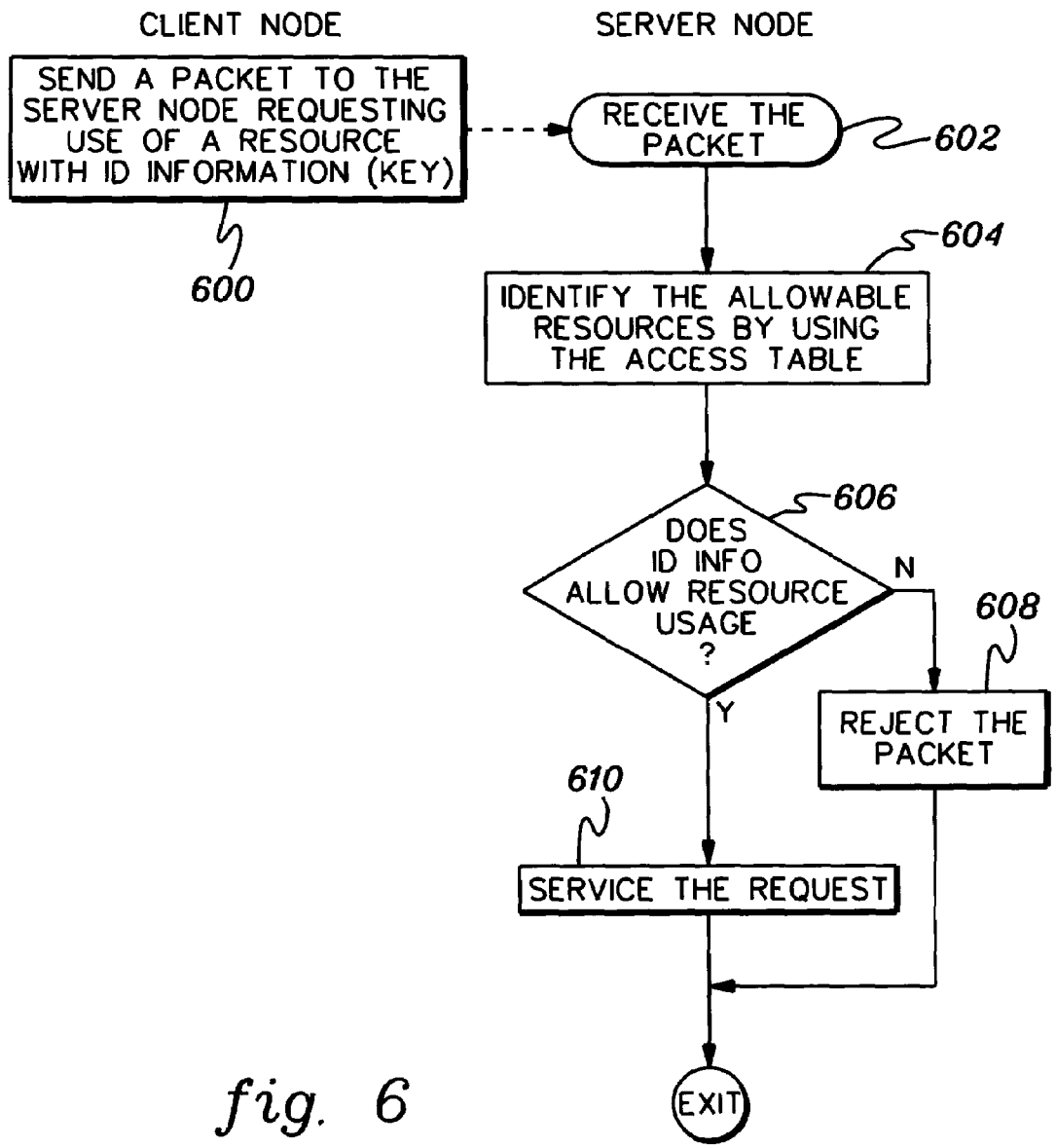
FIG. 6 depicts one embodiment of the logic associated with using the data structure, in accordance with an aspect of the present invention.

Subsequent to loading the access table, it is used during processing of requests from the various client nodes of the partitions. One embodiment of the logic associated with using the access table is described with reference to FIG. 6.

A client node sends a packet to the server node requesting use of a resource of the server node, STEP 600. The packet includes, for instance, the request, as well as an identifier of the client partition that includes the client node. As one example, this identifier is a partition key (P_key) provided by the manager. As shown in FIG. 3, manager 300 is responsible, in one example, for providing the nodes with partition keys (or other unique identifiers). One example of providing a node with a partition key is described in "InfiniBand™ Architecture Specification Volume 1," Release 1.1, Nov. 6, 2002, available from the InfiniBand Trade Association at 5440 SW Westgate Drive, Suite 217, Portland, Oreg., 97221, or online at www.Infinibandta.org, which is hereby incorporated herein by reference in its entirety.

The server node receives the packet, STEP 602, and uses the access table to identify the allowable resources, STEP 604. In particular, the key is used as an index into the access table to locate the resources assigned to the partition forwarding the request. Should it be that the identifier does not indicate any resource usage, INQUIRY 606, then the packet is rejected or the use of the resource by the requestor (e.g., the client making the request) is denied, STEP 608. Otherwise, the request is serviced, STEP 610. For example, data is written to or read from a particular device.

Described in detail above is a capability for providing a secure data structure that indicates particular resources assigned to a given client node. A client node is restricted to a subset of resources of a server node. This advantageously reduces cost, enhances security and improves performance by enabling resources of server nodes to be subdivided among different client nodes.

Although use of the access table is described above with reference to requests by client nodes to access resources, other types of client nodes including those that manage have access to the table, in accordance with an aspect of the present invention. For example, a connection manager has read only access in order to validate connection requests to a particular resource from a particular node. In InfiniBand, this function is performed by the communications manager. As a further example, a device manager also has read access to the table in order to provide an indication of the set of resources for a particular client node, in response to such a query. In InfiniBand, this is a task of the device manager.

Many types of environments may use one or more aspects of the present invention. The environments may or may not be partitioned. As one example, server configurations in which non-cooperating hosts, such as hosts under the control of different operating systems sharing a large I/O subsystem, can benefit from one or more aspects of the present invention. Although in the examples described above the resources within the server node to be divided include I/O controllers, one or more aspects of the present invention is not restricted to such resources. The capability is extendible to apply to any types of resources, including levels of services, and any types of nodes. Further, one or more server nodes may be coupled to a client node or client partition. In one example, each server node has its own access data structure and logic to determine the allowable resources of a particular client node or client partition.

Yet further, a communications environment may have more than one subnet. Further, the communications medium may be other than InfiniBand and architectures other than InfiniBand can be used.

In addition to the above, the logical mask used to indicate the available resources may be of many different types, including, but not limited to, a fixed or variable length bit string, a fixed or variable length byte string, etc. The mapping of a particular bit or byte string to the subdivision of resources within the node is arbitrary. That is, the resource partitioning mapping may represent virtual or physical resources, and the node implementer may specify the mapping in any manner.

Yet further, the data structure used to store the access information can be other than a table. A table is provided as only one example.

Advantageously, resources of a server node (in, for instance, an InfiniBand subnet) can be divided for exclusive use by a set of client nodes. By restricting use of the resources, a sharing client node is prevented from consuming a disproportionate amount of the resources.

Advantageously, one or more aspects of the present invention provides a secure technique of assigning node resources, thereby preventing unauthorized entities from assigning or reassigning the resources. It further provides a technique for various selected management entities to discover the configuration, in order to provide other services to client nodes (e.g., network users). Yet further, a technique for enforcing fair usage of common endnode resources (e.g., connections and bandwidth) is provided by restricting the amount of the resources which can be used for each user.

Advantageously, one or more aspects of the present invention enables a server node, and thus, the cost of that node, to be shared across many client nodes (or hosts), without jeopardizing security of the resources. Each client node has its own logical view of the server node. When the client node accesses the server node, the set of resources seen by the client node is restricted. The set of resources seen is based upon identification information provided by the client node when it accesses the server node.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of determining resources accessible to client nodes, said method comprising:

receiving information at a server node via a communications medium, said communications medium usable in accessing data at the server node, said server node comprising a plurality of physical resources to be shared by a plurality of clients coupled to the server node, wherein the plurality of physical resources comprise a plurality of input/output (I/O) resources;

determining by the server node whether the information was received via a trusted agent, said trusted agent being coupled to the server node and the plurality of client nodes, and wherein the determining by the server node whether the information was received via a trusted agent includes determining whether a manager key that is included within the received information is valid;

storing at least part of the information at the server node for use in determining the one or more physical resources assigned to the client node, in response to the determining indicating the information was received via a trusted agent, wherein the storing includes storing an access data structure having an indication of physical resources assigned to particular nodes, in response to the determining indicating that the manager key is valid; and using said information to determine one or more physical resources of the plurality of physical resources of said server node assigned to a given client node of the plurality of client nodes, wherein the client node is restricted access to the one or more determined physical resources such that one or more other physical resources of the plurality of physical resources is inaccessible to the client node.

2. The method of claim 1, further comprising sending the information from the trusted agent to the server node.

3. The method of claim 1, wherein the using is in response to receiving a request from the client node, the request requesting access to at least one physical resource of the server node, and wherein the request includes an identifier associated with the client node, said identifier usable as an index into the information to determine whether the at least one resource is assigned to the client node.

4. The method of claim 3, further comprising servicing the request, in response to determining that the at least one physical resource is assigned to the client node.

5. The method of claim 3, wherein the identifier is provided to the client node via a trusted agent.

6. The method of claim 1, wherein the client node and the server node are included within a same partition of nodes.

7. The method of claim 1, wherein at least one physical resource of the one or more physical resources assigned to the client node is inaccessible to another client node coupled to the server node.

8. The method of claim 7, wherein the client node and the another client node are in separate partitions of nodes, said separate partitions of nodes including the server node.

9. A system of determining resources accessible to client nodes, said system comprising:

a server node to receive information via a communications medium, said communications medium usable in accessing data at the server node, said server node comprising a plurality of physical resources to be shared by a plurality of clients coupled to the server node, wherein the plurality of physical resources comprise a plurality of input/output (I/O) resources;

said server node to determine whether the information was received via a trusted agent, said trusted agent being coupled to the server node and the plurality of client nodes, and wherein the determining by the server node whether the information was received via a trusted agent includes determining whether a manager key that is included within the received information is valid;

a storage coupled to the server node to store at least part of the information for use in determining the one or more physical resources assigned to the client node, the storing being in response to the determining indicating the information was received via a trusted agent, and wherein the storing includes storing an access data structure having an indication of physical resources assigned to particular nodes, in response to the determining indicating that the manager key is valid; and said server node to use said information to determine one or more physical resources of the plurality of physical resources of said server node assigned to a given client node of the plurality of client nodes, wherein the client node is restricted access to the one or more determined physical resources such that one or more other physical resources of the plurality of physical resources is inaccessible to the client node.

10. The system of claim 9, wherein the using is in response to receiving a request from the client node, the request requesting access to at least one physical resource of the server node, and wherein the request includes an identifier associated with the client node, said identifier usable as an index into the information to determine whether the at least one physical resource is assigned to the client node.

11. The system of claim 10, wherein the server node is adapted to service the request, in response to a determination that the at least one physical resource is assigned to the client node.

12. An article of manufacture comprising: at least one computer usable medium having computer readable program code logic to determine resources accessible to client nodes, the computer readable program code logic comprising:

receive logic to receive information at a server node via a communications medium, said communications medium usable in accessing data at the server node, said server node comprising a plurality of physical resources to be shared by a plurality of clients coupled to the server node, wherein the plurality of physical resources comprise a plurality of input/output (I/O) resources, determine logic to determine by the server node whether the information was received via a trusted agent, said trusted agent being coupled to the server node and the plurality of client nodes, and wherein the determining by the server node whether the information was received via a trusted agent includes determining whether a manager key that is included within the received information is valid;

store logic to store at least part of the information at the server node for use in determining the one or more physical resources assigned to the client node, in response to the determining indicating the information was received via a trusted agent, wherein the storing includes storing an access data structure having an indication of physical resources assigned to particular nodes, in response to the determining indicating that the manager key is valid; and use logic to use said information to determine one or more physical resources of the plurality of physical resources of said server node assigned to a given client node of the plurality of client nodes, wherein the client node is restricted access to the one or more determined physical resources such that one or more other physical resources of the plurality of physical resources is inaccessible to the client node.

13. The article of manufacture of claim 12, wherein the using is in response to receiving a request from the client node, the request requesting access to at least one physical resource of the server node, and wherein the request includes an identifier associated with the client node, said identifier usable as an index into the information to determine whether the at least one physical resource is assigned to the client node.

14. The article of manufacture of claim 13, further comprising service logic to service the request, in response to a determination that the at least one physical resource is assigned to the client node.

* * * * *